(12) United States Patent
Yano et al.

(10) Patent No.: US 10,924,949 B2
(45) Date of Patent: Feb. 16, 2021

(54) ABNORMALITY DETECTING METHOD AND ABNORMALITY DETECTING DEVICE

(71) Applicant: FUJITSU LIMITED, Kawasaki (JP)

(72) Inventors: Ai Yano, Kawasaki (JP); Takeshi Ohtani, Kawasaki (JP); Ryuichi Matsukura, Kawasaki (JP); Jun Kakuta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 16/267,132

(22) Filed: Feb. 4, 2019

(65) Prior Publication Data

US 2019/0306733 A1  Oct. 3, 2019

(30) Foreign Application Priority Data

Mar. 30, 2018  (JP) .................................. 2018-067459

(51) Int. Cl.
*H04W 24/08* (2009.01)
*H04L 12/24* (2006.01)
(Continued)

(52) U.S. Cl.
CPC ............ *H04W 24/08* (2013.01); *H04B 17/26* (2015.01); *H04B 17/318* (2015.01); *H04L 41/064* (2013.01); *H04L 41/0645* (2013.01); *H04L 41/142* (2013.01); *H04L 41/5009* (2013.01); *H04W 24/04* (2013.01)

(58) Field of Classification Search
CPC ...... H04W 24/08; H04L 41/04; H04L 41/142; H04L 41/5009; H04L 43/08
See application file for complete search history.

(56) References Cited

U.S. PATENT DOCUMENTS 6,912,568 B1  6/2005  Nishiki et al.
8,611,228 B2 * 12/2013  Matsunaga ........... H04L 1/0019
                                                            370/242
(Continued)

FOREIGN PATENT DOCUMENTS

JP  2001-44994 A  2/2001
JP  2005-100026 A  4/2005
(Continued)

*Primary Examiner* — Walli Z Butt
*Assistant Examiner* — Ryan C Kavleski
(74) *Attorney, Agent, or Firm* — Arent Fox LLP

(57) ABSTRACT

Provided is an abnormality detecting method implemented by a computer, the abnormality detecting method including: acquiring a plurality of pieces of performance information each containing performance of a management target device; determining whether abnormal performance information is included among the plurality of pieces of performance information, in accordance with a condition for determining an abnormality of the performance; when the abnormal performance information is included, identifying a type of a failure corresponding to the abnormal performance information, in accordance with a correspondence relationship that associates respective combinations of a plurality of identifiers indicating the abnormality of the performance with failure types; and deciding a degree of importance of a measure against the failure, in accordance with information related to the identified failure type.

15 Claims, 13 Drawing Sheets

(51) Int. Cl.
*H04B 17/26* (2015.01)
*H04B 17/318* (2015.01)
*H04W 24/04* (2009.01)

(56) References Cited

U.S. PATENT DOCUMENTS

| | | | |
|---|---|---|---|
| 9,167,454 B1* | 10/2015 | Gatmir-Motahari | ......................... H04W 48/16 |
| 2005/0149570 A1* | 7/2005 | Sasaki | ..................... G06Q 10/06 |
| 2013/0007524 A1* | 1/2013 | Vankov | ............... H04L 41/0681 714/32 |
| 2016/0253246 A1* | 9/2016 | Chow | .................. G06F 11/0706 714/19 |
| 2017/0201412 A1 | 7/2017 | Yano et al. | |

FOREIGN PATENT DOCUMENTS

| JP | 2006-277675 A | 10/2006 |
|---|---|---|
| JP | 2010-211674 A | 9/2010 |
| JP | 2017-123124 A | 7/2017 |
| WO | WO-2018/066041 A1 | 4/2018 |

* cited by examiner

FIG. 5

| SOURCE ID | TIME STAMP | COMMUNICATION PERFORMANCE ||||| TERMINAL PERFORMANCE ||
| | | RSSI | LQ | RESPONSE TIME | NUMBER OF RE-TRANSMISSION TIMES | ... | REMAINING BATTERY LEVEL | ... |
|---|---|---|---|---|---|---|---|---|
| ED1001 | 2016/1/1 00:00:00.000 | −53 | 254 | 26.77 | 0 | ... | 66 | ... |
| | 2016/1/1 00:00:00.100 | −55 | 251 | 26.39 | 0 | ... | | |
| | 2016/1/1 00:00:00.200 | −56 | 252 | 23.98 | 0 | ... | | |
| | 2016/1/1 00:00:00.300 | −54 | 253 | 26.82 | 0 | ... | | |
| | 2016/1/1 00:00:00.400 | −65 | 246 | 25.29 | 0 | ... | | |
| | 2016/1/1 00:00:00.500 | −54 | 244 | 25.97 | ... | ... | ... | ... |

EXCEEDING THRESHOLD

FIG. 7

| FAILURE TYPE | RSSI | LQ | RESPONSE TIME | NUMBER OF RE-TRANSMISSION TIMES | CPU USAGE RATE | MEMORY USAGE RATE |
|---|---|---|---|---|---|---|
| INTERFERENCE | 1 | 0 | 0 | 0 | | |
| SHIELDING | 1 | 1 | 1 | | | |

FIG. 8

| OC-CUR-RENCE SITE | FAILURE TYPE ||||||||
|---|---|---|---|---|---|---|---|---|
| | TIME SLOT ||||||||
| | OCCURRENCE FREQUENCY ||||||||
| | MEAN SPONTANEOUS RECOVERY TIME (SECOND) ||||||||
| L-P | CUTOFF ||||| NW OVERLOAD | | | ... |
| | ... | 7-8 | 8-9 | 9-10 | 10-11 | ... | ... | ... |
| | ... | 0 | 0 | 0 | 1 | ... | ... | ... |
| | ... | 0 | 0 | 0 | 3600 | ... | ... | ... |
| L-R | INTERFERENCE ||||| SHIELDING | NW OVERLOAD | ... |
| | ... | 7-8 | 8-9 | 9-10 | 10-11 | ... | ... | ... |
| | ... | 30 | 100 | 120 | 130 | ... | ... | ... |
| | ... | 1 | 1 | 3 | 30 | ... | ... | ... |
| D-P | DEAD BATTERY ||||| CPU LOAD | MEMORY SHORTAGE | ... |
| | ... | 7-8 | 8-9 | 9-10 | 10-11 | ... | ... | ... |
| | ... | 1 | 0 | 0 | 0 | ... | ... | ... |
| | ... | 1800 | 0 | 0 | 0 | ... | ... | ... |
| : | | | | | | | | |

FIG. 9

| SERVICE α | | | |
|---|---|---|---|
| OPERATING TIME/8:00-20:00 | | | |
| SOURCE ID | MEASUREMENT TARGET | SAMPLING INTERVAL | TRANSMISSION INTERVAL |
| ED1001 | TEMPERATURE | 1 MINUTE | 1 MINUTE |
| | HUMIDITY | 1 MINUTE | 1 MINUTE |
| | ⋮ | ⋮ | ⋮ |
| ED9876 | VIBRATION | ⋮ | ⋮ |
| | GAS CON-CENTRATION | ⋮ | ⋮ |
| | ⋮ | ⋮ | ⋮ |
| ⋮ | ⋮ | ⋮ | ⋮ |

FIG. 10A

| INTER-AXIAL COEFFICIENT | | IMPORTANCE VALUE | | | | |
|---|---|---|---|---|---|---|
| | RECOVERY TIME | ∞ | SEVERAL HOURS | SEVERAL MINUTES | SEVERAL SECONDS | 1 SECOND OR LESS |
| a = 1.0 | IMPORTANCE VALUE: A | 1.0 | 0.75 | 0.5 | 0.25 | 0.0 |
| | OCCURRENCE FREQUENCY | FREQUENT | LITTLE FREQUENT | NOT SO FREQUENT | NOT FREQUENT | FIRST TIME |
| b = 1.5 | IMPORTANCE VALUE: B | 1.0 | 0.75 | 0.5 | 0.25 | 0.0 |
| | OCCURRENCE SITE | GATEWAY | WIRELESS COMMUNICATION | WIRED COMMUNICATION | REPEATER | END DEVICE |
| c = 0.5 | IMPORTANCE VALUE: C | 1.0 | 0.75 | 0.5 | 0.5 | 0.25 |

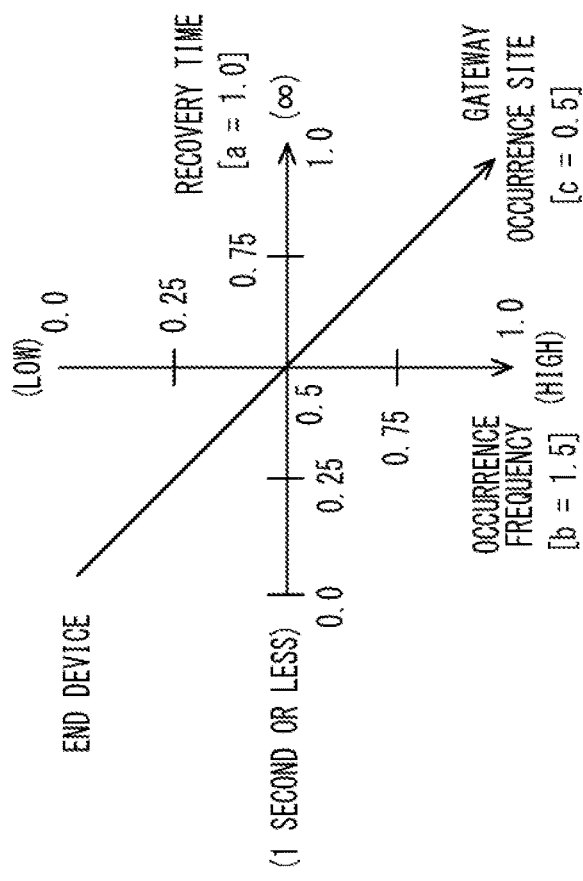

| SERVICE α ||
|---|---|
| CONDITION FOR ADDING SERVICE REQUISITE | ADDITIONAL COEFFICIENT |
| ENVIRONMENT INFORMATION TRANSMISSION INTERVAL < RECOVERY TIME | 1.0 |
| WITHIN OPERATING TIME | 1.0 |
| ... | ... |

ABNORMALITY DETECTING METHOD AND ABNORMALITY DETECTING DEVICE

CROSS-REFERENCE TO RELATED APPLICATION

This application is based upon and claims the benefit of priority of the prior Japanese Patent Application No. 2018-067459 filed on Mar. 30, 2018, the entire contents of which are incorporated herein by reference.

FIELD

The present invention relates to an abnormality detecting method, a non-transitory computer readable medium, and an abnormality detecting device.

BACKGROUND

There is a known technique by which an abnormality of wireless communication is detected, and the manager is notified of an occurrence of a wireless communication failure and the cause of the failure (see Japanese Patent Application Laid-Open No. 2017-123124, for example).

SUMMARY

According to an aspect of the embodiments, there is provided an abnormality detecting method implemented by a computer, the abnormality detecting method including: acquiring a plurality of pieces of performance information each containing performance of a management target device; determining whether abnormal performance information is included among the plurality of pieces of performance information, in accordance with a condition for determining an abnormality of the performance; when the abnormal performance information is included, identifying a type of a failure corresponding to the abnormal performance information, in accordance with a correspondence relationship that associates respective combinations of a plurality of identifiers indicating the abnormality of the performance with failure types; and deciding a degree of importance of a measure against the failure, in accordance with information related to the identified failure type.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an example of a performance information management table;

FIG. 7 is an example of correspondence relationship that associates respective combinations of identifiers indicating performance abnormalities with failure types;

FIG. 8 is an example of a related information management table;

FIG. 9 is an example of a requisite information management table;

FIG. 10A is a diagram for explaining an example of importance determinants for determining degrees of incident importance, and FIG. 10B is another diagram for explaining an example of importance determinants for determining degrees of incident importance;

FIG. 11 is a diagram for explaining additional coefficients;

DESCRIPTION OF EMBODIMENTS

When a failure such as the above mentioned wireless communication failure occurs, the manager (hereinafter referred to as the operation manager) is expected to determine various measures, such as whether to take any measure against the failure and the sequence of measures to be taken.

However, the sites and the causes of failure occurrences vary, and it is difficult for the operation manager to appropriately determine the measures to be taken. For example, in a case where the cause of a wireless communication failure is interference, the interference might be spontaneously solved in several seconds, and the operation manager does not necessarily actively take any measure against the interference.

The following is a description of modes for carrying out the present invention, with reference to the drawings.

First Embodiment

Figure 1:
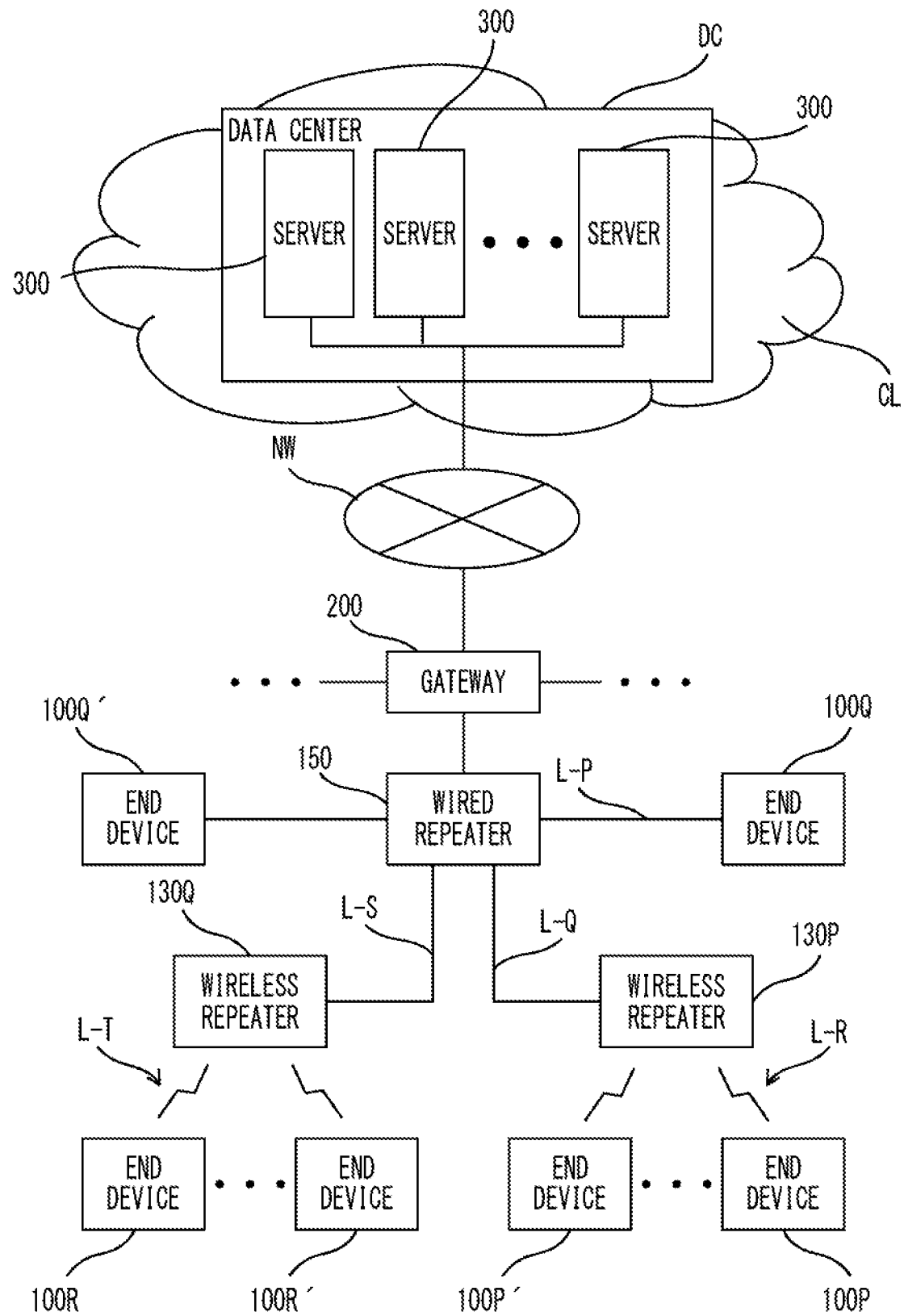
FIG. 1 is a diagram for explaining an example of an abnormality detecting system.

FIG. 1 is a diagram for explaining an example of an abnormality detecting system ST. The abnormality detecting system ST includes, as components, a plurality of end devices 100P, 100P', 100Q, 100Q', 100R, and 100R' that are management target devices. The abnormality detecting system ST also includes, as components, wireless repeaters 130P and 130Q, a wired repeater 150, and a gateway 200 that is an abnormality detecting device. The abnormality detecting system ST further includes, as a component, a data center DC including a plurality of servers 300. In this manner, the servers 300 are formed in a cloud CL. However, the abnormality detecting system ST may exclude at least one of the following devices: the wireless repeaters 130P and 130Q, the wired repeater 150, and the data center DC. Further, the management target devices may include at least one of the following devices: the wireless repeaters 130P and 130Q, the wired repeater 150, and the gateway 200.

The end device 100P is installed at various kinds of places. For example, the end device 100P is installed at a manufacturing facility in a manufacturing plant, to regularly measure temperature and humidity in or around the manufacturing facility, or regularly measure vibration of the manufacturing facility. For example, the end device 100P may be attached to the back surface of the cover of a utility hole. In this case, the end device 100P regularly measures temperature and humidity under the utility hole, or regularly measures the height of the wastewater flowing below the utility hole or the concentration of the gas existing under the utility hole.

The end device 100P also regularly measures various kinds of communication performance that can determine a communication status or communication quality (hereinafter referred to simply as the communication state). The communication performance may be represented by a received signal strength indicator (RSSI), a packet error rate (PER), link quality (LQ), a response time, the number of retransmission times, a channel usage rate, or the number of active nodes, for example. Further, the end device 100P regularly measures various kinds of operating performance (hereinafter referred to as terminal performance) that can determine the operating status or the operating situation (hereinafter referred simply as the operating state) of the hardware or the software of the end device 100P. The terminal performance may be represented by a central processing unit (CPU) usage rate, a memory usage rate, a hard disk drive (HDD) usage rate, a remaining battery level, in-device temperature, in-device humidity, or an internal processing time, for example.

The end device 100P is connected directly to the wireless repeater 130P with a link L-R. The wireless repeater 130P is a Wi-Fi (registered trademark) router or an access point, for example. Therefore, the link L-R is a wireless link, and corresponds to near field communication such as Wi-Fi (registered trademark) or Bluetooth (registered trademark). With this, the end device 100P and the wireless repeater 130P can exchange various kinds of information with each other. That is, the end device 100P can communicate with the wireless repeater 130P. Accordingly, where the end device 100P measures communication performance and terminal performance, for example, the end device 100P regularly transmits performance information containing the measured communication performance and terminal performance to the wireless repeater 130P. The end device 100P may transmit performance information containing the communication performance but not containing the terminal performance. The details of the end devices 100P', 100R, and 100R' are the same as those of the end device 100P, and therefore, explanation of them is not made herein. Likewise, the details of the wireless repeater 130Q are the same as those of the wireless repeater 130P, and therefore, explanation of them is not made herein. Accordingly, a link L-T is also a wireless link, and corresponds to near field wireless communication such as Wi-Fi (registered trademark) or Bluetooth (registered trademark).

Here, the wireless repeater 130P is connected directly to the wired repeater 150 with a link L-Q. Likewise, the wireless repeater 130Q is connected directly to the wired repeater 150 with a link L-S. The wired repeater 150 may be a broadband router or a switching hub, for example. The links L-Q and L-S are both wired links, and correspond to communication cables such as electrical communication cables or optical communication cables. With this, the wireless repeater 130P and the wired repeater 150 can exchange various kinds of information with each other. Likewise, the wireless repeater 130Q and the wired repeater 150 can exchange various kinds of information with each other.

Meanwhile, the end device 100Q, like the end device 100P, is installed at various kinds of places, and regularly measures communication performance, terminal performance, and the like. The end device 100Q is connected directly to the wired repeater 150 with a link L-P. The link L-P is also a wired link, and corresponds to a communication cable such as an electrical communication cable or an optical communication cable as described above. With this, the end device 100Q and the wired repeater 150 can exchange various kinds of information with each other. Accordingly, where the end device 100Q measures communication performance and terminal performance, the end device 100Q regularly transmits performance information containing the measured communication performance and terminal performance to the wired repeater 150. The details of the end device 100Q' are the same as those of the end device 100Q, and therefore, explanation of them is not made herein.

The wired repeater 150 is connected directly to the gateway 200. Accordingly, each of the above described plurality of end devices 100P and 100P' is connected indirectly to the gateway 200 via the wireless repeater 130P and the wired repeater 150. Likewise, each of the above described plurality of end devices 100R and 100R' is connected indirectly to the gateway 200 via the wireless repeater 130Q and the wired repeater 150. Meanwhile, each of the above described plurality of end devices 100Q and 100Q' is connected indirectly to the gateway 200 via the wired repeater 150. With this, each of the end devices 100P, 100P', 100Q, 100Q', 100R, and 100R' can exchange various kinds of information with the gateway 200.

In a case where the plurality of end devices 100P, 100P', 100Q, 100Q', 100R, and 100R' are installed at respective manufacturing facilities, the gateway 200 is installed at a location inside or outside the manufacturing plant. In a case where the plurality of end devices 100P, 100P', 100Q, 100Q', 100R, and 100R' are attached to the back surfaces of the covers of utility holes, on the other hand, the gateway 200 is attached to a utility pole or the like.

From the various kinds of information collected from the respective end devices 100P, 100P', 100Q, 100Q', 100R, and 100R', the gateway 200 detects abnormalities in the respective end devices 100P, 100P', 100Q, 100Q', 100R, and 100R'. From the various kinds of information collected from the respective end devices 100P, 100P', 100Q, 100Q', 100R, and 100R', the gateway 200 also detects abnormalities in the respective links L-P, L-Q, L-R, L-S, and L-T. Here, the gateway 200 is connected to at least one of the plurality of servers 300 via a communication network NW. Accordingly, when detecting an abnormality, the gateway 200 can transmit the occurrence of a failure and the type or the cause of the failure (hereinafter referred to simply as the failure type) to the servers 300. As a result, the operation manager can check the occurrence of the failure and the failure type and determine the measure to be taken against the failure, by operating an operation management terminal (not shown) that is a terminal device capable of accessing the servers 300.

Such an operation management terminal may be connected to the communication network NW, or may be connected to the server 300. In a case where the operation management terminal is connected to the communication network NW, the operation management terminal is connected indirectly to the gateway 200 via the communication network NW. In a case where the operation management terminal is connected to the server 300, on the other hand, the operation management terminal is connected indirectly to the gateway 200 via the server 300 and the communication network NW.

In the description below, each of the end devices 100P, 100P', 100Q, 100Q', 100R, and 100R', and the gateway 200 will be explained in detail.

Figure 2:
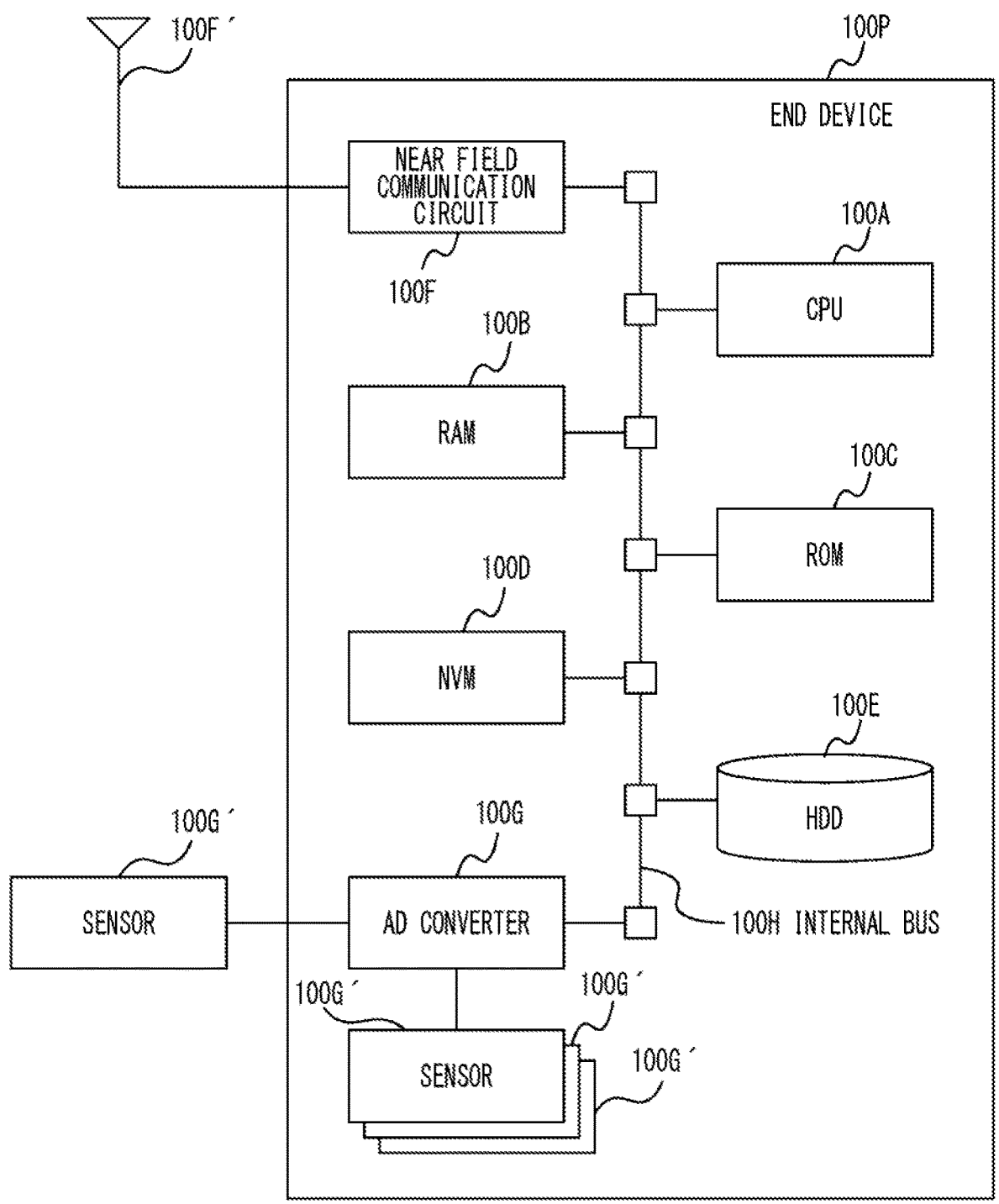
FIG. 2 is an example of the hardware configuration of an end device.

FIG. 2 is an example of the hardware configuration of the end device 100P. The hardware configurations of the end devices 100P', 100Q, 100Q', 100R, and 100R' are the same as the hardware configuration of the end device 100P, and therefore, explanation of them is not made herein. As illustrated in FIG. 2, the end device 100P includes a CPU 100A, a random access memory (RAM) 100B, a read only memory (ROM) 100C, and a non-volatile memory (NVM) 100D. The end device 100P also includes an HDD 100E, a near field communication circuit 100F, and an analog/digital (AD) converter 100G An antenna 100F' is connected to the near field communication circuit 100F. Instead of the near field communication circuit 100F, a CPU that achieves a wireless communication function may be used. A plurality of sensors 100G' are connected to the AD converter 100G The sensors 100G' include a temperature sensor, a humidity sensor, a concentration sensor, and an acceleration sensor. The components from the CPU 100A to the AD converter 100G are connected to one another with an internal bus 100H.

A program stored in at least one of the ROM 100C, the NVM 100D, and the HDD 100E is stored into the above mentioned RAM 100B by the CPU 100A. The program may be a program for measuring and transmitting communication performance and terminal performance. As the CPU 100A executes the stored program, the end device 100P can measure communication performance and terminal performance, and transmit performance information containing the communication performance and the terminal performance. Since the end device 100P includes the plurality of sensors 100G', the end device 100P may be called a sensor node.

Figure 3:
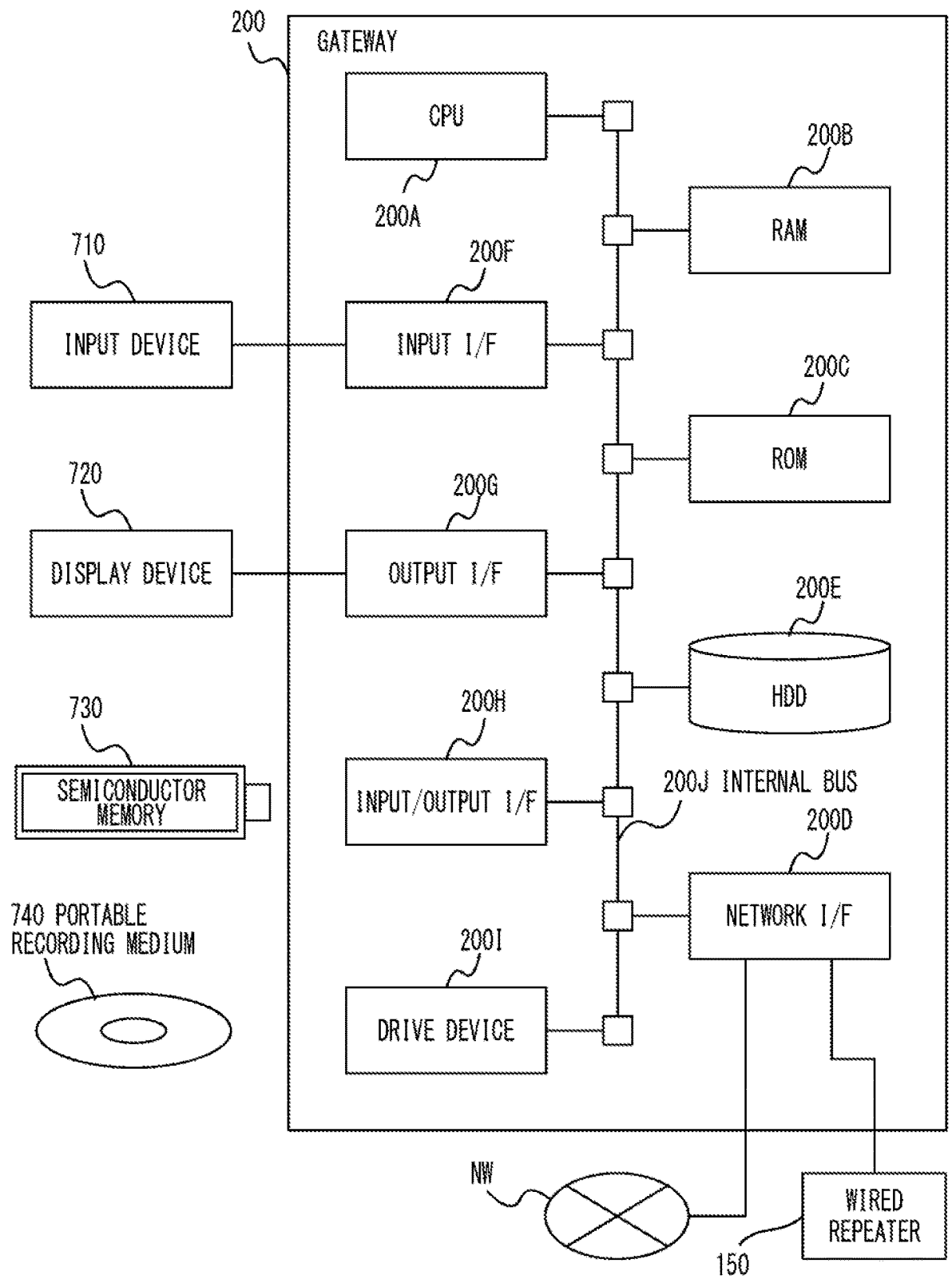
FIG. 3 is an example of the hardware configuration of a gateway.

FIG. 3 is an example of the hardware configuration of the gateway 200. As illustrated in FIG. 3, the gateway 200 includes at least a CPU 200A as a hardware processor, a RAM 200B, a ROM 200C, and a network interface (I/F) 200D. The gateway 200 may also include at least one of the following components as necessary: an HDD 200E, an input I/F 200F, an output I/F 200G an input/output I/F 200H, and a drive device 200I. The components from the CPU 200A to the drive device 200I are connected to one another with an internal bus 200J. That is, the gateway 200 may be formed with a computer. Instead of the CPU 200A, a microprocessing unit (MPU) may be used as the hardware processor.

An input device 710 is connected to the input I/F 200F. The input device 710 may be a keyboard and a mouse, for example. A display device 720 is connected to the output I/F 200G The display device 720 may be a liquid crystal display, for example. A semiconductor memory 730 is connected to the input/output I/F 200H. The semiconductor memory 730 may be a universal serial bus (USB) memory or a flash memory, for example. The input/output I/F 200H reads a program or data stored in the semiconductor memory 730. The input I/F 200F and the input/output I/F 200H include USB ports, for example. The output I/F 200G includes a display port, for example.

A portable recording medium 740 is inserted into the drive device 200I. The portable recording medium 740 may be a removable disk such as a compact disc (CD)-ROM or a digital versatile disc (DVD), for example. The drive device 200I reads a program or data recorded on the portable recording medium 740. The network I/F 200D includes a LAN port, for example. The network I/F 200D is connected to the above described wired repeater 150 and communication network NW.

A program stored in the ROM 200C or the HDD 200E is temporarily stored into the above described RAM 200B by the CPU 200A. A program recorded on the portable recording medium 740 is temporarily stored into the RAM 200B by the CPU 200A. As the CPU 200A executes the stored program, the CPU 200A achieves the various kinds of functions described later, and performs the various kinds of processes described later. Here, the program should correspond to the flowchart described later.

Referring now to FIGS. 4 through 11, the respective functions of the gateway 200 are described.

Figure 4A:
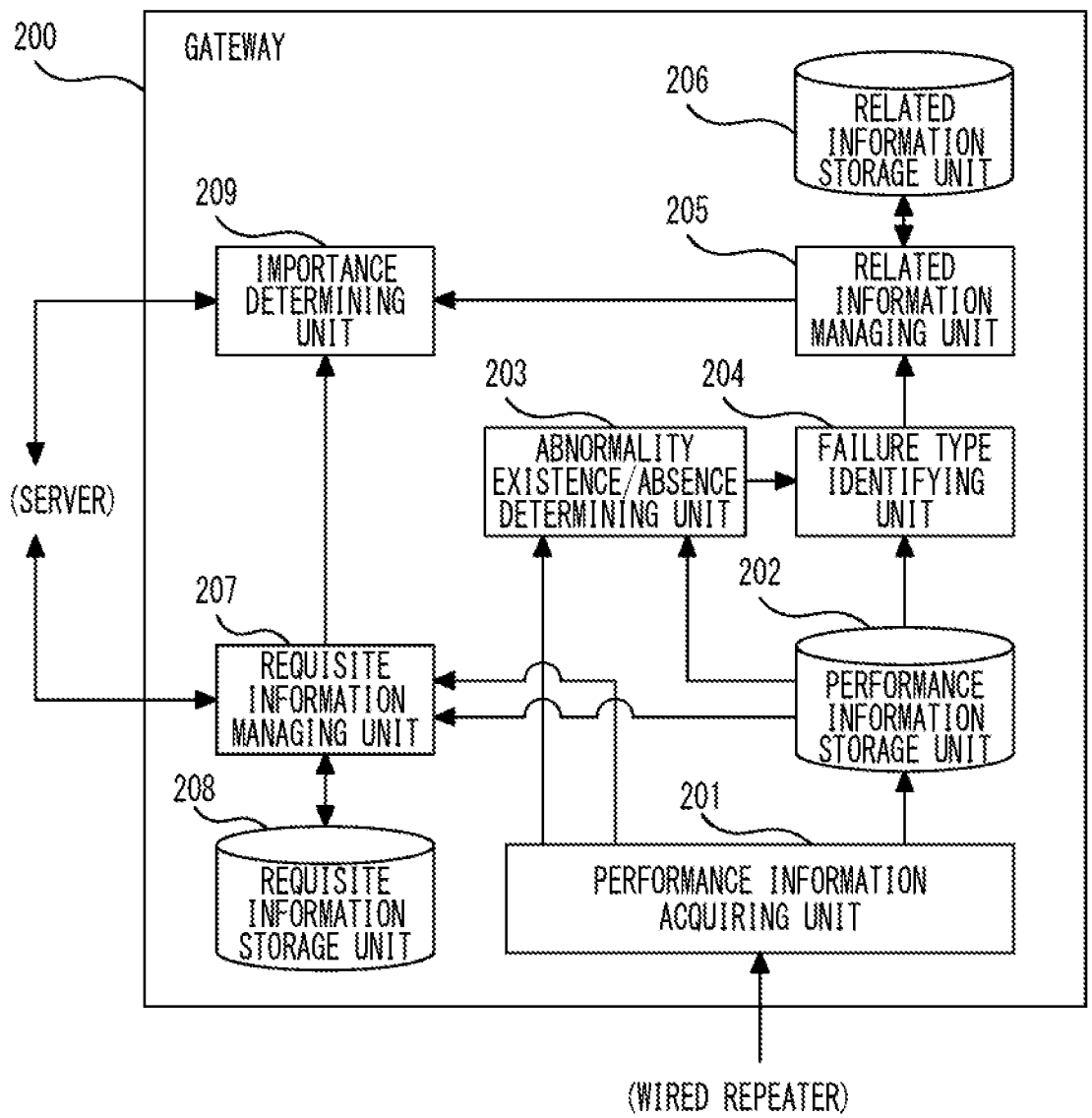
FIG. 4A is an example of a block diagram of the gateway.
Figure 4B:
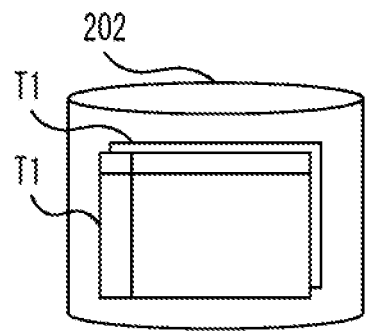
FIG. 4B is an example of a performance information storage unit.
Figure 4C:
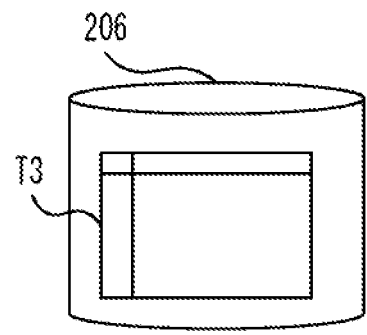
FIG. 4C is an example of a related information storage unit.
Figure 4D:
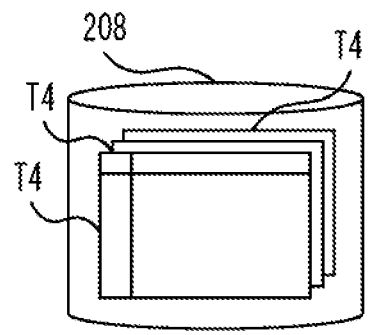
FIG. 4D is an example of a requisite information storage unit.
Figure 6:
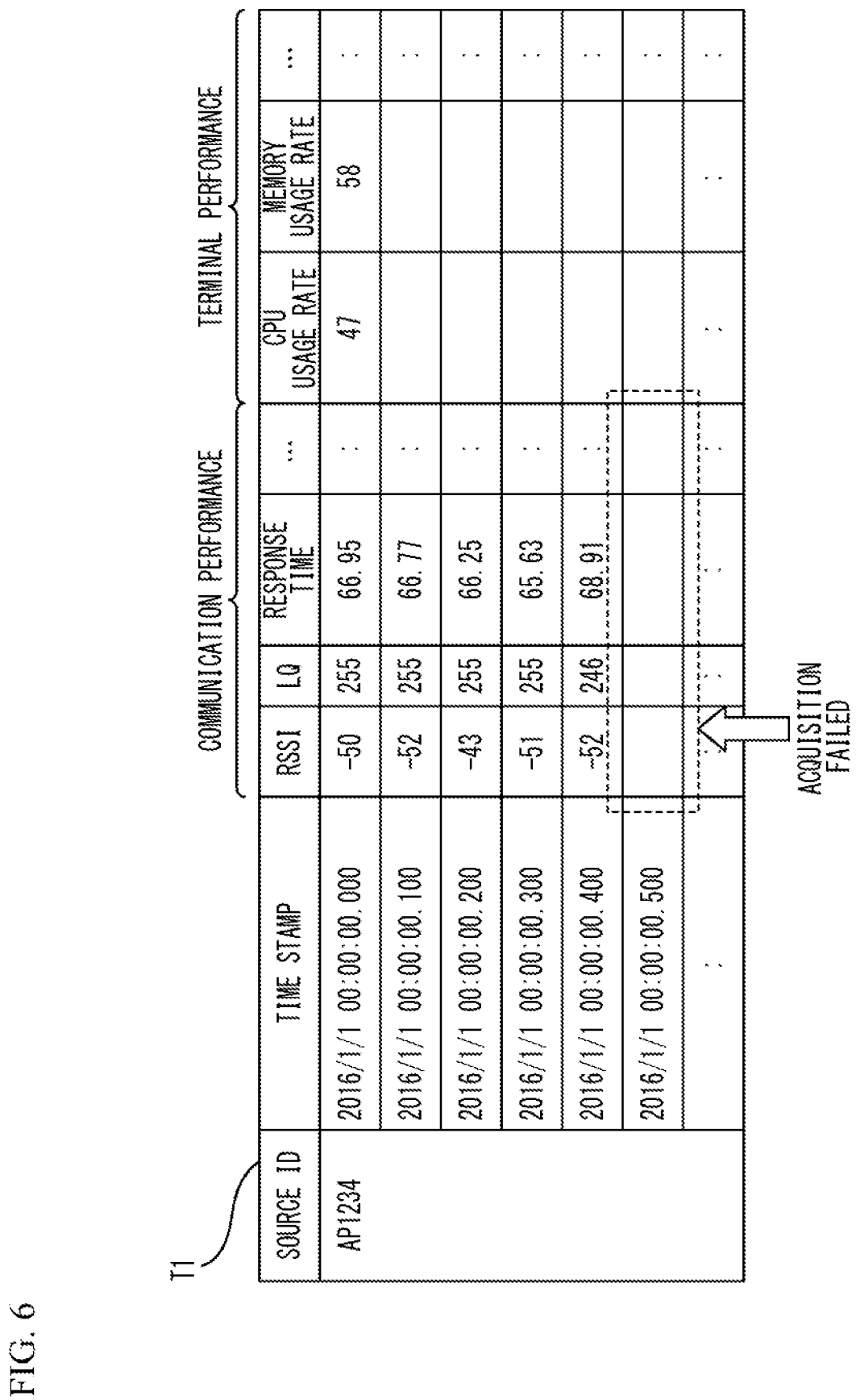
FIG. 6 is another example of a performance information management table.

FIG. 4A is an example of a block diagram of the gateway 200. FIG. 4B is an example of a performance information storage unit 202. FIG. 4C is an example of a related information storage unit 206. FIG. 4D is an example of a requisite information storage unit 208. FIG. 5 is an example of a performance information management table T1. FIG. 6 is another example of the performance information management table T1. FIG. 7 is an example of correspondence relationship that associates respective combinations of identifiers indicating performance abnormalities with failure types.

FIG. 8 is an example of a related information management table T3. FIG. 9 is an example of a requisite information management table T4. FIG. 10A is a diagram for explaining an example of importance determinants that determine degrees of importance of incidents. FIG. 10B is another diagram for explaining an example of importance determinants that determine degrees of importance of incidents. FIG. 11 is a diagram for explaining additional coefficients.

As illustrated in FIG. 4A, the gateway 200 includes a performance information acquiring unit 201, the performance information storage unit 202, an abnormality existence/absence determining unit 203, and a failure type identifying unit 204. The gateway 200 also includes a related information managing unit 205, the related information storage unit 206, a requisite information managing unit 207, the requisite information storage unit 208, and an importance determining unit 209. The performance information acquiring unit 201, the abnormality existence/absence determining unit 203, the failure type identifying unit 204, and the importance determining unit 209 are an example of the processing unit described later, and can be formed with the CPU 200A described above. The related information managing unit 205 and the requisite information managing unit 207 may also be included in the processing unit. The performance information acquiring unit 201 may be formed with the network I/F 200D described above. Meanwhile, the performance information storage unit 202, the related information storage unit 206, and the requisite information storage unit 208 can be formed with the RAM 200B or the HDD 200E described above.

As illustrated in FIG. 4A, the performance information acquiring unit 201 acquires performance information containing communication performance and terminal performance via the wired repeater 150. More specifically, the performance information acquiring unit 201 notifies each of the end devices 100P, 100P', 100Q, 100Q', 100R, and 100R' of the intervals of sampling of communication performance and terminal performance. The performance information acquiring unit 201 may notify each of the end devices 100P, 100P', 100Q, 100Q', 100R, and 100R' of the intervals of transmission of the performance information, as necessary. The performance information acquiring unit 201 may also notify each of the end devices 100P, 100P', 100Q, 100Q', 100R, and 100R' of the intervals of sampling of environment values such as temperature, humidity, vibration, and gas concentration, or the intervals of transmission of environment information containing the environment values.

For example, in the case of an acquisition method by which the performance information acquiring unit 201 acquires performance information from each of the end devices 100P, 100P', 100Q, 100Q', 100R, and 100R', the performance information acquiring unit 201 does not need to issue a transmission interval notification. In this case, the intervals of acquisition of performance information may be constant or may vary. In the case of a transmission method to transmit performance information only when a change occurs in the communication performance, and in the case of a transmission method to transmit performance information only when a change occurs in the terminal performance, the performance information acquiring unit 201 does not need to issue a transmission interval notification. In the case of a transmission method to regularly transmit performance information, on the other hand, the performance information acquiring unit 201 issues a transmission interval notification.

In accordance with one of these various transmission methods, the performance information acquiring unit 201 receives performance information transmitted from each of the end devices 100P, 100P', 100Q, 100Q', 100R, and 100R'. By doing so, the performance information acquiring unit 201 acquires performance information. After acquiring the performance information, the performance information acquiring unit 201 stores the acquired performance information into the performance information storage unit 202. After storing the performance information, the performance information acquiring unit 201 notifies the abnormality existence/absence determining unit 203 and the requisite information managing unit 207 of the updating of the performance information storage unit 202.

The performance information acquiring unit 201 may acquire not only performance information about the end devices 100P, 100P', 100Q, 100Q', 100R, and 100R', but also performance information about each of the wireless repeaters 130P and 130Q. Likewise, the performance information acquiring unit 201 may acquire performance information about the wired repeater 150 and performance information about the gateway 200.

The performance information storage unit 202 stores the performance information described above. As illustrated in FIG. 4B, the performance information is managed for respective sources by a plurality of performance information management tables T1. As illustrated in FIGS. 5 and 6, each performance information management table T1 includes a source ID field, a time stamp field, a plurality of communication performance fields each showing communication performance, and a plurality of terminal performance fields each showing terminal performance.

Identification information for identifying the source that transmitted the performance information is registered in the source ID field. For example, the source ID "ED1001" shown in FIG. 5 represents the identification information about the end device 100P. Meanwhile, the source ID "AP1234" shown in FIG. 6 represents the identification information about the wireless repeater 130P. In the time stamp field, the times and dates when the performance information acquiring unit 201 acquired the performance information are registered in chronological order by milliseconds.

Measured values of RSSIs, response times, and the like are registered in the respective communication performance fields. As will be described later, a measured value exceeding a predetermined threshold might be registered as illustrated in FIG. 5, or a measured value might fail to be acquired and registered as illustrated in FIG. 6. Meanwhile, measured values of remaining battery levels, CPU usage rates, and the like are registered in the respective terminal performance fields. As illustrated in FIGS. 5 and 6, in this embodiment, the performance information acquiring unit 201 acquires performance information containing communication performance but not containing terminal performance at intervals of milliseconds, and acquires performance information containing both communication performance and terminal performance at intervals different from the intervals of milliseconds.

The abnormality existence/absence determining unit 203 acquires a plurality of the latest pieces of performance information from the performance information storage unit 202, and determines whether the acquired pieces of performance information include abnormal performance information. When notified of updating of the performance information storage unit 202 by the performance information acquiring unit 201, the abnormality existence/absence determining unit 203 determines whether abnormal performance information is included, in accordance with a determining condition for determining an abnormality in communication performance or terminal performance. The determining condition may be whether a measured value exceeds a predetermined threshold as illustrated in FIG. 5, or may be whether acquisition of a measured value is failed, and the measured value is missing as illustrated in FIG. 6. The abnormality existence/absence determining unit 203 may use a determining condition that is whether there is a received error message transmitted from the end device 100P or the wireless repeater 130P or the like.

In a case where a measured value exceeds a predetermined threshold, a measured value is missing, or an error message is received, the abnormality existence/absence determining unit 203 determines that abnormal performance information is included. Alternatively, it is possible to determine whether there is an abnormality, by acquiring the latest pieces of performance information from the performance information storage unit 202, calculating a feature amount such as the mean value or the variance value of measured values, and determining whether the calculated feature amount exceeds a threshold.

In a case where the abnormality existence/absence determining unit 203 determines that abnormal performance information is included, and the abnormal performance information relates to an abnormality in communication performance, the abnormality existence/absence determining unit 203 transmits, to the failure type identifying unit 204, an abnormality occurrence notification containing the source ID of the performance information, the time stamp, the name of the communication performance (such as RSSI or LQ), and the measured value of the communication performance. In a case where the abnormality existence/absence determining unit 203 determines that abnormal performance information is included, and the abnormal performance information relates to an abnormality in terminal performance, on the other hand, the abnormality existence/absence determining unit 203 transmits, to the failure type identifying unit 204, an abnormality occurrence notification containing the source ID of the performance information, the time stamp, the name of the terminal performance (such as remaining battery level or CPU usage rate), and the measured value of the terminal performance.

Upon receipt of an abnormality occurrence notification, the failure type identifying unit 204 acquires, from the performance information storage unit 202, at least one of the latest pieces of performance information corresponding to the source ID and the time stamp contained in the abnormality occurrence notification. After acquiring the performance information, the failure type identifying unit 204 identifies the type of the failure, using the measured value of the communication performance or the terminal performance contained in the performance information. Here, the failure type identifying unit 204 holds correspondence relationship that associates respective combinations of a plurality of identifiers indicating abnormalities in communication performance and terminal performance, and a plurality of identifiers indicating normalities in communication performance and terminal performance with failure types. Therefore, the failure type identifying unit 204 identifies a failure type, in accordance with this correspondence relationship and the name and measured value of the communication performance or the terminal performance contained in the abnormality occurrence notification.

For example, in a case where the failure type identifying unit 204 receives an abnormality occurrence notification indicating that there is an abnormality in RSSI, but there are no abnormalities in LQ, the response time, and the number of transmission times, the failure type identifying unit 204 determines the failure type to be interference, in accordance with the correspondence relationship. In a case where the failure type identifying unit 204 receives an abnormality occurrence notification indicating that there are no abnormalities in RSSI, LQ, and the response time, on the other hand, the failure type identifying unit 204 determines the failure type to be shielding, in accordance with the correspondence relationship. After identifying the failure type, the failure type identifying unit 204 transmits, to the related information managing unit 205, a failure detail notification containing the identified failure type, a failure occurrence date indicating the determination date or the identifying date, and the source ID.

Although the failure type identifying unit 204 acquires at least one piece of the latest performance information, the information to be acquired may be the latest several pieces, or the several pieces before and after the time stamp of the performance information determined to have an abnormality. Further, the number of pieces of information to be acquired may be changed depending on the cycles or the amount of change in the measured value of the performance information, or the like. For example, in the case of communication performance, there is a high possibility that a disorderly or nonlinear change will occur, and therefore, a large number of pieces of performance information, such as several tens of pieces of performance information, are acquired. In the case of terminal performance, on the other hand, there is a high possibility that a linear change will occur, and therefore, a small number of pieces of performance information, such as ten to nineteen pieces of performance information, are acquired. In this manner, the number of pieces of information to be acquired may be changed, depending on whether there is an abnormality in communication performance or whether there is an abnormality in terminal performance. Although the failure type identifying unit 204 uses the correspondence relationship in identifying a failure type, some other known analysis technique may be used. The analysis technique may be cluster analysis, trend analysis, comparison between the learning pattern in a normal state and a cluster, or the like.

Upon receipt of a failure detail notification from the failure type identifying unit 204, the related information managing unit 205 manages, with the related information storage unit 206, various kinds of information related to the failure type identified by the failure type identifying unit 204, in accordance with the received failure detail notification. Here, the related information is managed by a related information management table T3, as illustrated in FIG. 4C. As illustrated in FIG. 8, the related information management table T3 includes elements that are an occurrence site field, a failure type field, a time slot field, an occurrence frequency field, and a mean spontaneous recovery time field.

Information that indicates the site at which a failure has occurred is registered in the occurrence site field. For example, an occurrence site "L-P" indicates the link L-P (see FIG. 1). For example, an occurrence site "L-R" indicates the link L-R (see FIG. 1). For example, an occurrence site "D-P" indicates the end device 100P (see FIG. 1). Particularly, in a case where the failure type is a communication failure in wireless communication, such as interference or shielding, the related information managing unit 205 identifies the link L-R, which is on the higher side of the end device 100P or the like having transmitted the performance information indicating the communication failure, as the occurrence site. The related information managing unit 205 then registers the link L-R in the occurrence site field. Alternatively, the link L-R, the link L-P, and the like as occurrence sites are not necessarily distinguished from one another, and all the occurrence sites may be managed with the source IDs.

The failure type contained in the failure detail notification is registered in the failure type field. For example, if cutting of a communication cable is contained as the failure type in the failure detail notification, the cutting is registered in the failure type field. If interference of wireless communication is contained as the failure type in the failure detail notification, interference is registered in the failure type field. In the time slot field, hourly time slots are registered. The time slots are registered in advance. The time slots may be further divided into shorter time slots distinguishing weekdays from holidays. Alternatively, the time slot field is not necessarily provided.

The number of failures that have occurred in the time slot is registered as a measurement result in the occurrence frequency field. The number of occurrences may be registered for each time slot on each weekday and each holiday. In a case where the time slot field is not provided, the total number of occurrences not divided by the time slots may be registered. In the mean spontaneous recovery time field, the mean number of seconds in which a target failure spontaneously recovered is registered as a measurement result. For example, a case where photovoltaic generation is conducted when the battery has run out may be regarded as a case of a spontaneous recovery. On the other hand, a case where a utility worker has exchanged communication cables when a communication cable was cut off is not regarded as a case of a spontaneous recovery, and therefore, a predetermined maximum value (3600 seconds, for example) is registered as a measurement result.

While failure detail notifications of one type with the same failure type and the same source ID are received from the failure type identifying unit 204, the related information managing unit 205 determines that a failure of the type has been continuing to occur at the source identified by the source ID. When reception of failure detail notifications of the same kind stops, the related information managing unit 205 determines that the failure of that type has spontaneously recovered at the source identified by the source ID. The related information managing unit 205 then calculates a spontaneous recovery time indicating the time from the start of reception of failure detail notifications of the same kind till the end of reception of failure detail notifications of the same kind. The related information managing unit 205 manages a spontaneous recovery time for each time slot. If no spontaneous recovery is made in a time slot, the spontaneous recovery time in the time slot is set at the maximum value (3600 seconds). Alternatively, the related information managing unit 205 may calculate the mean value of spontaneous recovery times for each time slot, or may use the maximum value of a spontaneous recovery time. In FIG. 8, the mean value of spontaneous recovery times is shown as a mean spontaneous recovery time.

When notified of updating of the performance information storage unit 202 by the performance information acquiring unit 201, the requisite information managing unit 207 acquires the latest pieces of performance information from the performance information storage unit 202, and identifies the source IDs corresponding to the acquired performance information. After identifying the source IDs, the requisite information managing unit 207 calculates a sampling interval or a transmission interval for each identified source ID, and manages the results as requisite information. The requisite information managing unit 207 also acquires various kinds of information related to each service being provided by the cloud CL or application software for realizing the service (the application software will be hereinafter referred to simply as the application), and manages the acquired information as requisite information. The various kinds of information related to a service include the name of the service, a request time for the server 300 to request the above described environment information, and a principal operating time of the service. Alternatively, even if there is no update notification, the requisite information managing unit 207 may acquire a sampling interval or a transmission interval transmitted as a notification from the performance information acquiring unit 201, and manage the acquired interval as requisite information. Further, even if there is no update notification, the requisite information managing unit 207 may calculate a sampling interval or a transmission interval on a regular basis (once a day, for example) and manage the calculated result as requisite information, in accordance with all the performance information stored in the performance information storage unit 202.

Here, the requisite information is managed for the respective services by a plurality of requisite information management tables T4, as illustrated in FIG. 4D. As illustrated in FIG. 9, each requisite information management table T4 includes a service field, an operating time field, a source ID field, a measurement target field, a sampling interval field, and a transmission interval field.

The name of a service acquired by the requisite information managing unit 207 is registered in the service field. From the name of the service, the above mentioned request time can be determined. The operating time of the service acquired by the requisite information managing unit 207 is registered in the operating time field. Identification information about the end device 100P or 100R, the wireless repeater 130P, or the like is registered in the source ID field. Temperature and humidity measured by the end device 100P, vibration and gas concentration measured by the end device 100R, or the like is registered in the measurement target field. A sampling interval acquired by the requisite information managing unit 207 is registered in the sampling interval field. A transmission interval acquired by the requisite information managing unit 207 is registered in the transmission interval field. In this manner, the requisite information managing unit 207 manages, with the requisite information storage unit 208, the requisite information that includes the operating time of each service, and the sampling interval or the transmission interval of the measurement target to be requested by each service for each source ID.

In accordance with the related information being managed by the related information managing unit 205, the importance determining unit 209 determines the degree of importance corresponding to the failure type as the degree of incident importance. The importance determining unit 209 may determine the degree of incident importance, in accordance with the requisite information being managed by the requisite information managing unit 207, as well as the related information. In this manner, the importance determining unit 209 can determine a highly accurate degree of incident importance. In this embodiment, an incident is a failure type identified by the failure type identifying unit 204, and the various kinds of processes performed by the failure type identifying unit 204 when a failure type is identified are not included in incidents. Therefore, it is safe to say that the related information managing unit 205 manages information related to an incident, in accordance with the incident identified by the failure type identifying unit 204. In accordance with the managed information, the importance determining unit 209 determines the degree of importance corresponding to the incident as the degree of incident importance.

Specifically, the importance determining unit 209 determines a degree of incident importance according to the arithmetic expression (1) shown below.

$$\text{Degree of incident importance} = a \times A + b \times B + c \times C + \text{additional coefficient} \quad (1)$$

Here, $a \times A + b \times B + c \times C$ represents principal importance information generated by the importance determining unit 209 in accordance with the above described related information. In the arithmetic expression (1), multiplication and addition are shown as an example of an arithmetic operation. However, multiplication and addition are not necessarily used, and subtraction and/or division may be used instead. The principal importance information should contain at least one of different kinds of individual importance information $a \times A$, $b \times B$, and $c \times C$. Although the number of the different kinds of individual importance information is three in this embodiment, the number of the different kinds of individual importance information may be two or four. Here, a, b, and c each represent an inter-axial coefficient, as shown in FIGS. 10A and 10B. The three inter-axial coefficients a, b, and c are coefficients that are dynamically adjusted and determined so that the mean value among the three axes of a first axis, a second axis, and a third axis becomes a predetermined value (such as 1.0 or 10.0). The first axis is the axis indicating the magnitude of an importance value A representing the value corresponding to the degree of importance related to the recovery time. The second axis is the axis indicating the magnitude of an importance value B representing the value corresponding to the degree of importance related to the occurrence frequency. The third axis is the axis indicating the magnitude of an importance value C representing the value corresponding to the degree of importance related to the occurrence site. With this, the degree of incident importance is prevented from becoming higher in one of the importance values A, B, and C defined by the first axis, the second axis, and the third axis, respectively. Meanwhile, the importance values A, B, and C are numerical values that are dynamically defined in the range of 0.0 to 1.0 on the first axis, the second axis, and the third axis, respectively, as shown in FIGS. 10A and 10B. The importance determining unit 209 stores beforehand the respective kinds of information shown in FIGS. 10A and 10B.

For example, as shown in FIG. 10A, a plurality of items indicating the lengths of recovery times, such as ∞, several hours, several minutes, several seconds, and within one second, are set beforehand as recovery times. Note that ∞ indicates that there was no spontaneous recovery. It is also possible to create a normal distribution of recovery times for each failure type, and set a plurality of items so that the mode value becomes 0.5. Further, as shown in FIG. 10A, a plurality of items indicating occurrence frequencies, such as frequent, a little frequent, not so frequent, not frequent, and first time, are set as the occurrence frequencies, in accordance with a predetermined threshold. A normal distribution of occurrence frequencies may be created for each failure type, and a plurality of items may be set so that the mode value becomes 0.5. Further, as shown in FIG. 10A, a plurality of items, such as gateway, wireless communication, wired communication, repeater, and end device, are set as the occurrence sites, as shown in FIG. 10A. Particularly, gateway is set at 1.0 as an importance value, and importance values are then set in descending order. This indicates the magnitude of influence on the abnormality detecting system ST when a failure occurs. Alternatively, a normal distribution of the number of the end devices 100P or the wireless repeaters 130P that have influence may be created for each failure type, and a plurality of items may be set so that the mode value becomes 0.5.

Meanwhile, the importance determining unit 209 generates the additional coefficient in the arithmetic expression (1) for each service, in accordance with the requisite information. The importance determining unit 209 determines the degree of incident importance by adding at least one of the generated additional coefficients for the respective services to the principal importance information. For example, as shown in FIG. 11, in a case where the recovery time is longer than the transmission interval (see FIG. 9), there is a hindrance to or trouble in operating a service α, and therefore, 1.0 is set as the additional coefficient. Likewise, in a case where a failure occurs within the operating time of the service α, there is a hindrance to or trouble in operating a service α, and therefore, 1.0 is set as the additional coefficient. The importance determining unit 209 adds such an additional coefficient to the principal importance information. The maximum additional coefficient is 1.0. In a case where there is a plurality of additional coefficients, all the additional coefficients may be set at 1.0. Alternatively, numerical values obtained by dividing 1.0 by the number of additional coefficients may be used as individual additional coefficients so that the total sum of the individual additional coefficients becomes 1.0. The importance determining unit 209 stores beforehand the various kinds of information shown in FIG. 11.

Figure 12:
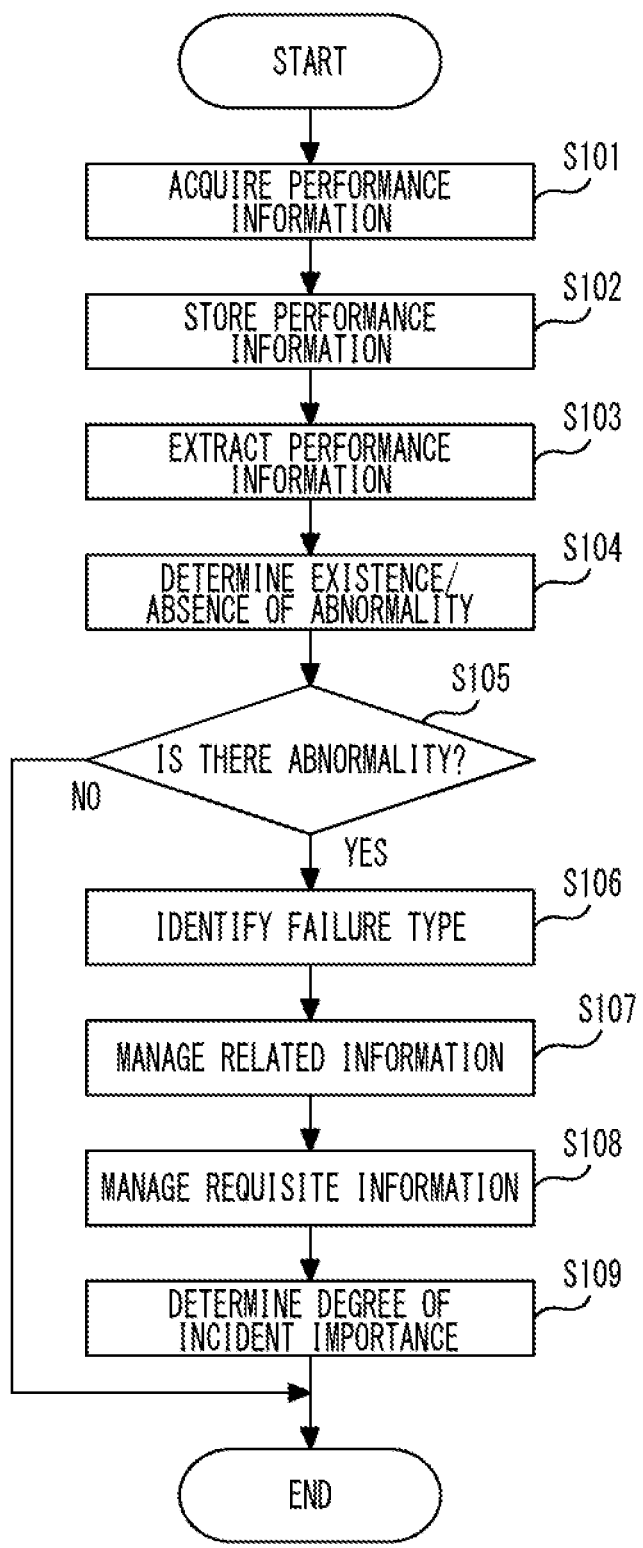
FIG. 12 is a flowchart showing an example of operation of the gateway.

FIG. 12 is a flowchart showing an example of operation of the gateway 200. As shown in FIG. 12, the performance information acquiring unit 201 of the gateway 200 acquires performance information (step S101). The performance information contains communication performance and terminal performance. After acquiring the performance information, the performance information acquiring unit 201 stores the acquired performance information into the performance information storage unit 202 (step S102).

After the process in step S102 is completed, the abnormality existence/absence determining unit 203 extracts a plurality of pieces of performance information (step S103), and determines whether abnormal performance information is included (step S104). If the abnormality existence/absence determining unit 203 determines that no abnormal performance information is included (step S105: NO), the process comes to an end. If the abnormality existence/absence determining unit 203 determines that abnormal performance information is included (step S105: YES), on the other hand, the failure type identifying unit 204 identifies a failure type (step S106).

After the process in step S106 is completed, the related information managing unit 205 manages related information (step S107), and the requisite information managing unit 207 manages requisite information (step S108). The process in step S108 may be performed at any stage after the process in step S102 and before the process in step S109. Alternatively, the process in step S108 is not necessarily performed. After the process in step S107 or S108 is completed, the importance determining unit 209 determines a degree of incident importance (step S109), and the process comes to an end.

As described above, according to the first embodiment, the gateway 200 includes the performance information acquiring unit 201, the abnormality existence/absence determining unit 203, the failure type identifying unit 204, and the importance determining unit 209. The performance information acquiring unit 201 acquires a plurality of pieces of performance information each containing performance of the end device 100P and the like. In accordance with the determination condition for determining whether there is a performance abnormality, the abnormality existence/absence determining unit 203 determines whether abnormal performance information is included among the plurality of pieces of performance information. In a case where abnormal performance information is included, the failure type identifying unit 204 identifies the type of the failure corresponding to the abnormal performance information, in accordance with the correspondence relationship that associates respective combinations of identifiers indicating performance abnormalities with failure types. The importance determining unit 209 determines the degree of incident importance, in accordance with information related to the identified failure type. In this manner, it is possible to aid the operation manager to determine the measure to be taken against the failure.

Particularly, the production line in the manufacturing plant is changed with products to be manufactured. Therefore, the use of the end device 100P and the like capable of wireless communication is preferable to the use of the end device 100Q and the like that perform wired communication. In a case where wireless communication is used, a communication failure such as shielding might occur due to the size of the manufacturing facility, or a communication failure such as interference might occur due to some other wireless communication existing in the vicinity. According to this embodiment, however, even if such a communication failure occurs, the operation manager can appropriately determine the measure to be taken, in accordance with the degree of incident importance, and reduce the delay in the operation of a service due to the communication failure.

Further, if the specifications of the hardware of the end device 100P, the gateway 200, and the like are insufficient, or if the software is vulnerable, original performance cannot be exhibited, and a terminal failure occurs while measured values cannot be acquired. According to this embodiment, however, even if such a terminal failure occurs, the operation manger can appropriately determine the measure to be taken, in accordance with the degree of incident importance. Thus, it is possible to reduce the delay in the operation of a service due to the terminal failure.

Second Embodiment

Figure 13:
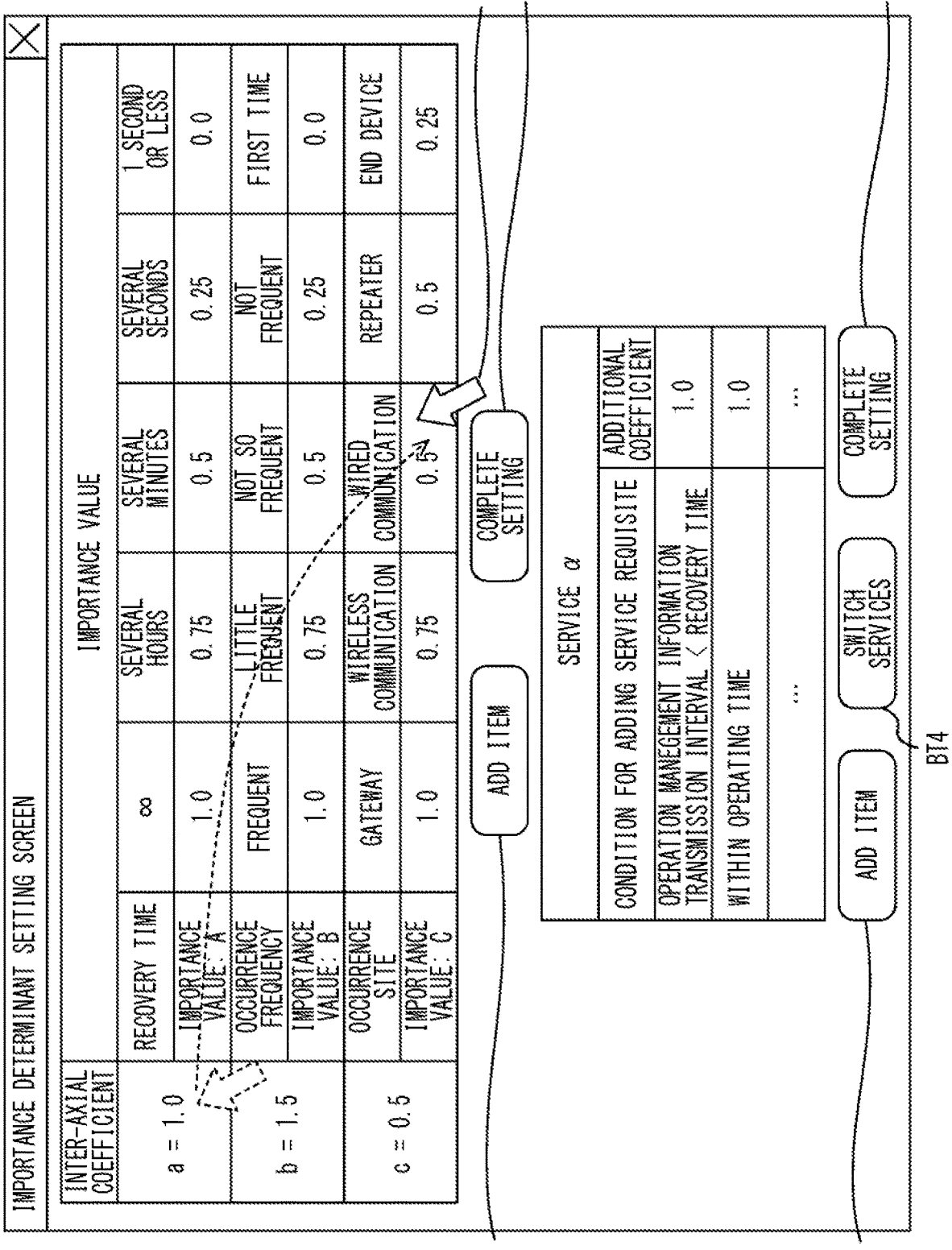
FIG. 13 is an example of an importance determinant setting screen.

Referring now to FIG. 13, a second embodiment of the present invention is described. FIG. 13 is an example of an importance determinant setting screen. The importance determinant setting screen is displayed on an operation management terminal, in accordance with an operation performed by the operation manager. The application for displaying the importance determinant setting screen is installed in the server 300, for example. The server 300 transmits various kinds of information set through the importance determinant setting screen, to the gateway 200. The various kinds of information to be transmitted from the server 300 to the gateway 200 include inter-axis coefficients, various kinds of items, importance values, and additional coefficients that will be described later. Specifically, the server 300 transmits inter-axis coefficients, various kinds of items, and importance values to the importance determining unit 209, and transmits additional coefficients and the conditions for adding the additional coefficients to the requisite information managing unit 207. As a result, the importance determining unit 209 holds the inter-axis coefficients, the various kinds of items, and the importance values, and the requisite information managing unit 207 holds the additional coefficients and the adding conditions.

Any of the three inter-axial coefficients described in the first embodiment can be set through the importance determinant setting screen. Specifically, one of the numerical values displayed in the inter-axial coefficient column on the importance determinant setting screen is selected with a pointer Pt, the numerical value is directly input, and a setting completion button BT1 is pressed, to set an inter-axial coefficient. A processing unit (not shown) of the server 300 may perform dynamic adjustment so that the importance values do not concentrate on a certain axis due to the input numerical value, and the mean value becomes 1.0.

Also, any of the items indicating the lengths of recovery times, the items indicating occurrence frequencies, and the items indicating occurrence sites described in the first embodiment can be set through the importance determinant setting screen. For example, one of the character strings displayed in the occurrence frequency row on the importance determinant setting screen is selected with the pointer Pt, the character string is directly input, and the setting completion button BT1 is pressed, to set a plurality of items. In doing so, it is possible to input an arithmetic expression using an inequality sign, or the like.

Further, any of the three importance values described in the first embodiment can be set through the importance determinant setting screen. Specifically, one of the numerical values displayed in the importance value row on the importance determinant setting screen is selected with the pointer Pt, the numerical value is directly input, and the setting completion button BT1 is pressed, to set an importance value. In accordance with the input numerical value, the processing unit of the server 300 may adjust the remaining numerical value in the range of 0.0 to 1.0 on one axis.

Further, the principal importance information described in the first embodiment may be added through the importance determinant setting screen. Specifically, an item addition button BT2 on the importance determinant setting screen is pressed with the pointer Pt, so that the respective input fields for an inter-axial coefficient and an importance value appears. With this, a new inter-axial coefficient and a new importance value can be set, and a highly accurate degree of incident importance can be determined.

Further, any of the additional coefficients described in the first embodiment can be set through the importance determinant setting screen. Specifically, one of the numerical values displayed in the additional coefficient column on the importance determinant setting screen is selected with the pointer Pt, the numerical value is input directly, and a setting completion button BT3 is pressed, to set an additional coefficient. Alternatively, a service switch button BT4 may be pressed with the pointer Pt, to switch target services to which the additional coefficient is to be added.

Further, the above described additional coefficient may be added through the importance determinant setting screen. Specifically, an item addition button BT5 on the importance determinant setting screen is pressed with the pointer Pt, so that an input field for adding the additional coefficient appears. With this, a new additional coefficient can be set, and a highly accurate degree of incident importance can be determined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An abnormality detecting method implemented by a computer, the abnormality detecting method comprising:
    acquiring a plurality of pieces of performance information each containing performance of a management target device;
    determining whether abnormal performance information is included among the plurality of pieces of performance information, in accordance with a condition for determining an abnormality of the performance;
    when the abnormal performance information is included, identifying a type of a failure corresponding to the abnormal performance information, in accordance with a correspondence relationship that associates respective combinations of a plurality of identifiers indicating the abnormality of the performance with failure types; and
    deciding a degree of importance of a measure against the failure, in accordance with information related to the identified failure type;
    wherein the deciding includes deciding the degree of importance, using a plurality of coefficients, a mean value of the coefficients being a predetermined value among a first axis indicating a magnitude of the first importance value, a second axis indicating a magnitude of the second importance value, and a third axis indicating a magnitude of the third importance value.

2. The abnormality detecting method according to claim 1, wherein
    the deciding includes deciding the degree of importance, in accordance with a result of an arithmetic operation using a coefficient corresponding to an element contained in the related information and a value corresponding to a result of measurement of a measurable element contained in the related information.

3. The abnormality detecting method according to claim 1, wherein
    the deciding includes deciding the degree of importance, in accordance with at least one of a first importance value, a second importance value, and a third importance value, the first importance value indicating a value corresponding to a degree of importance of a time required for recovering from a failure of the identified failure type, the second importance value indicating a value corresponding a degree of importance of occurrence frequency of a failure of the identified failure type, the third importance value indicating a value corresponding to a degree of importance of an occurrence site of a failure of the identified failure type.

4. The abnormality detecting method according to claim 1, further comprising
managing an interval of transmission of environment information containing an environment value measured by the management target device, wherein
the deciding includes deciding the degree of importance, in accordance with the related information, and a relationship between a time required for recovering from a failure of the identified failure type and the transmission interval.

5. The abnormality detecting method according to claim 1, further comprising
managing an operating time of a service to be provided in accordance with an environment value measured by the management target device, wherein
the deciding including deciding the degree of importance, in accordance with the related information and a coefficient determined from a relationship between the operating time and a time slot in which the failure has occurred.

6. The abnormality detecting method according to claim 1, wherein a coefficient corresponding to an element contained in the related information and a value corresponding to a result of measurement of a measurable element contained in the related information are set from a terminal device connected indirectly to the computer.

7. The abnormality detecting method according to claim 1, wherein the performance includes communication performance capable of identifying a communication state of the management target device, and operating performance capable of identifying an operating state of the management target device.

8. A non-transitory computer readable medium storing an abnormality detecting program that causes a computer to execute a process, the process comprising:
acquiring a plurality of pieces of performance information each containing performance of a management target device; determining whether abnormal performance information is included among the plurality of pieces of performance information, in accordance with a condition for determining an abnormality of the performance;
when the abnormal performance information is included, identifying a type of a failure corresponding to the abnormal performance information, in accordance with a correspondence relationship that associates respective combinations of a plurality of identifiers indicating the abnormality of the performance with failure types; and
deciding a degree of importance of a measure against the failure, in accordance with information related to the identified failure type;
wherein the deciding includes deciding the degree of importance, using a plurality of coefficients, a mean value of the coefficients being a predetermined value among a first axis indicating a magnitude of the first importance value, a second axis indicating a magnitude of the second importance value, and a third axis indicating a magnitude of the third importance value.

9. An abnormality detecting device comprising
a memory; and
a processor coupled to the memory and configured to:
acquire a plurality of pieces of performance information each containing performance of a management target device,
determine whether abnormal performance information is included among the plurality of pieces of performance information, in accordance with a condition for determining an abnormality of the performance,
when the abnormal performance information is included, identifying a type of a failure corresponding to the abnormal performance information, in accordance with a correspondence relationship that associates respective combinations of a plurality of identifiers indicating the abnormality of the performance with failure types, and
decide a degree of importance of a measure against the failure, in accordance with information related to the identified failure type;
wherein the processor is further configured to decide the degree of importance, using a plurality of coefficients, a mean value of the coefficients being a predetermined value among a first axis indicating a magnitude of the first importance value, a second axis indicating a magnitude of the second importance value, and a third axis indicating a magnitude of the third importance value.

10. The abnormality detecting device according to claim 9, wherein
the processor is configured to decide the degree of importance, in accordance with a result of an arithmetic operation using a coefficient corresponding to an element contained in the related information and a value corresponding to a result of measurement of a measurable element contained in the related information.

11. The abnormality detecting device according to claim 9, wherein
the processor is configured to decide the degree of importance, in accordance with at least one of a first importance value, a second importance value, and a third importance value, the first importance value indicating a value corresponding to a degree of importance of a time required for recovering from a failure of the identified failure type, the second importance value indicating a value corresponding a degree of importance of occurrence frequency of a failure of the identified failure type, the third importance value indicating a value corresponding to a degree of importance of an occurrence site of a failure of the identified failure type.

12. The abnormality detecting device according to claim 9, wherein
the processor is configured to manage an interval of transmission of environment information containing an environment value measured by the management target device, and determines the degree of importance, in accordance with the related information, and a relationship between a time required for recovering from a failure of the identified failure type and the transmission interval.

13. The abnormality detecting device according to claim 9, wherein
the processor is configured to manage an operating time of a service to be provided in accordance with an environment value measured by the management target device, and determines the degree of importance, in accordance with the related information and a coefficient determined from a relationship between the operating time and a time slot in which the failure has occurred.

14. The abnormality detecting device according to claim 9, wherein
a coefficient corresponding to an element contained in the related information and a value corresponding to a result of measurement of a measurable element contained in the related information are set from a terminal device connected indirectly to the abnormality detecting device.

15. The abnormality detecting device according to claim 9, wherein
the performance includes communication performance capable of identifying a communication state of the management target device, and operating performance capable of identifying an operating state of the management target device.

* * * * *